Patented June 16, 1925.

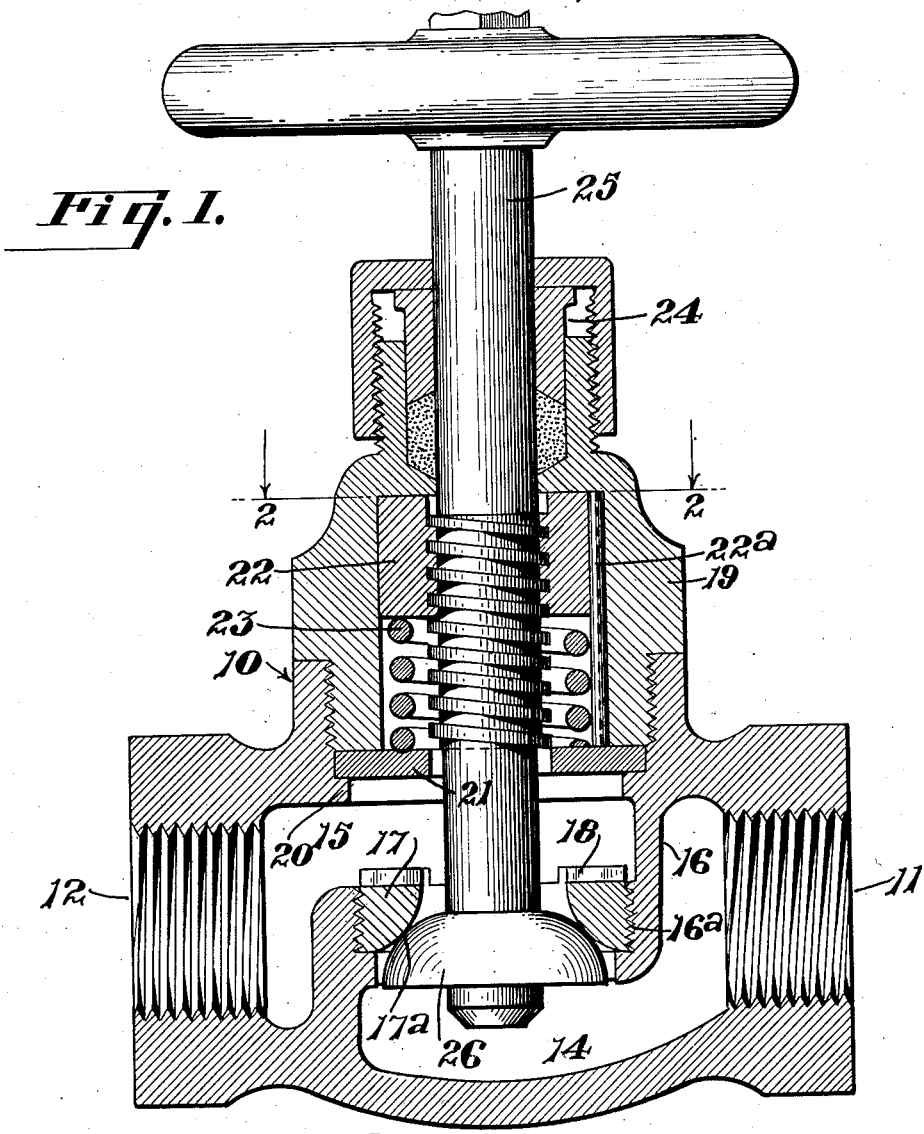

1,542,612

UNITED STATES PATENT OFFICE.

LLOYD D. COLLAR, OF ALAMEDA, CALIFORNIA, ASSIGNOR TO COLLAR VALVE CORPORATION, OF OAKLAND, CALIFORNIA, A CORPORATION OF CALIFORNIA.

VALVE.

Application filed January 30, 1924. Serial No. 689,546.

*To all whom it may concern:*

Be it known that I, LLOYD D. COLLAR, a citizen of the United States, residing at Alameda, county of Alameda, and State of California, have invented new and useful Improvements in Valves, of which the following is a specification.

This invention relates to valves of the self-grinding type.

It is the principal object of the present invention to generally improve the construction and operation of valves of the character referred to, whereby to provide a valve constructed in a manner entirely eliminating the necessity of disassembling it and regrinding the valve member and its seat. The valve is efficient in operation and comparatively inexpensive to manufacture.

In carrying out this object, I provide a valve in which the valve member and its seat are formed with convex seating faces, the valve member being mounted for movement toward and away from the seat in a manner causing it to grind on the seat each time it is opened and closed, thus insuring perfect seating of the valve member and obviating the necessity of having the valve disassembled and the valve member and its seat reground.

One form which the invention may assume is described in the following, and illustrated by way of example in the accompanying drawings, in which:—

Fig. 1 is a vertical section through a valve disclosing the preferred form of the invention.

Fig. 2 is a horizontal section through the bonnet of the valve taken on line 2—2 of Fig. 1.

Referring more particularly to the accompanying drawings, I show a valve body 10 formed with an inlet connection 11 and an outlet connection 12 forming inlet and outlet chambers 14 and 15. These chambers are shown as arranged in the same plane and are separated by a partition wall 16. This wall is formed with a threaded aperture 16$^a$ within which is threaded a valve seat member 17 which is formed with a divergent convex valve seat 17$^a$. The valve seat member may be threaded into or disengaged from the threads in the aperture 16$^a$ and removed from the valve body by the use of a suitable tool engageable with the lugs 18 on the upper surface of the seat member 17.

In vertical alignment with the valve seat, the valve body is bored and threaded to receive the threaded end of a centrally bored bonnet 19. Below the bonnet an annular lip 20 is formed in the valve body 10. Between this lip and the end of the bonnet a ring 21 is positioned. When the bonnet is threaded into place the ring will be securely held in position.

Reciprocably mounted in the bore of the bonnet, is a sleeve 22 which is feathered in the bonnet by a dowl pin 22$^a$. This latter element permits the sleeve to reciprocate but prevents it from rotating. An expansion spring 23 is interposed between this sleeve and the ring 21. This spring tends to maintain the sleeve in its uppermost position as shown in Fig. 1.

The bonnet is fitted at its upper end with a packing gland 24 which forms a guide for a valve stem 25. A valve member 26 is fitted at the lower end of the valve stem for co-operation with the valve seat. The face of this valve member is divergent and convex.

The central portion of the valve stem 25 is slightly enlarged and is formed with threads which engage similar threads formed in the reciprocable sleeve 22. The upper end of the valve stem is fitted with a hand wheel whereby it may be rotated to open and close the valve.

In operation, assuming that the valve is closed and the parts are in the position illustrated in Fig. 1, continued rotation of the valve stem in the direction tending to close the valve will tend to force the sleeve 22 inwardly against the pressure of the spring 23. This will cause a grinding action between the divergent and convex seating surfaces of the valve member 26 and the seat member 17. When the stem is rotated to unseat the valve member a similar grinding action will take place until the sleeve 22 has been moved into contact with the outer end of the bonnet. Continued rotation of the stem will then unseat the valve.

By forming the seating faces of the valve member and its seat divergent and convex, a continued grinding action will take place therebetween and will eventually result in the forming of flat tapered faces on the seat and valve. The area of these faces will increase with the use of the valve. As the seating faces of the valve member and its seat are convex there is no possibility of the grinding action causing an annular ridge to be formed in the seat to prevent proper seating of the valve member.

The construction described permits the valve to be manufactured and assembled at a minimum of expense.

It is obvious from the foregoing that a very desirable valve has been provided which will require a minimum of repairs and attention when in use, and which will not be liable to leak.

While I have shown the preferred form of my invention, it is understood that various changes may be made in its construction without departing from the spirit of the invention as defined in the appended claims.

Having thus described my invention, what I claim and desire to secure by Letters Patent is:—

1. A valve comprising a valve body having inlet and outlet chambers, a partition wall between said chambers, said wall being formed with a valve opening surrounded by a divergent convex valve seat, a cylindrically bored bonnet on the valve body mounted on the body at right angles to the longitudinal axis of the inlet and outlet chambers and in alignment with said valve opening, a sleeve in said bonnet and mounted therein for reciprocating movement only, an annular member in the valve body at the bottom of the bonnet, an expansion spring in the bonnet and interposed between the sleeve and said annular member, a valve stem reciprocably mounted in the bonnet and threaded through said sleeve, a valve member having a divergent convex face carried at the lower end of said stem for co-operation with said convex valve seat.

2. A valve comprising a valve body having inlet and outlet chambers, a partition wall therebetween, said wall being formed with a valve opening having a removable member with a convex seat, a cylindrically bored bonnet mounted on the valve body, an annular ring secured in the valve body at the innermost end of the bonnet, a reciprocable sleeve member mounted in the bonnet and held from turning movement, an expansion spring in the bonnet and interposed between said annular ring and the sleeve member, a valve stem reciprocably mounted in the bonnet and threaded through said sleeve, a valve member having a convex face mounted at the inner end of the stem for co-operation with the valve opening and seat.

LLOYD D. COLLAR.